INVENTOR.
MIRCEA CALISTRAT

June 23, 1970          M. CALISTRAT          3,516,561
METHOD FOR SEPARATING INTERLACED STACKS OF PAPERBOARD BLANKS
Original Filed Sept. 11, 1967          11 Sheets-Sheet 9
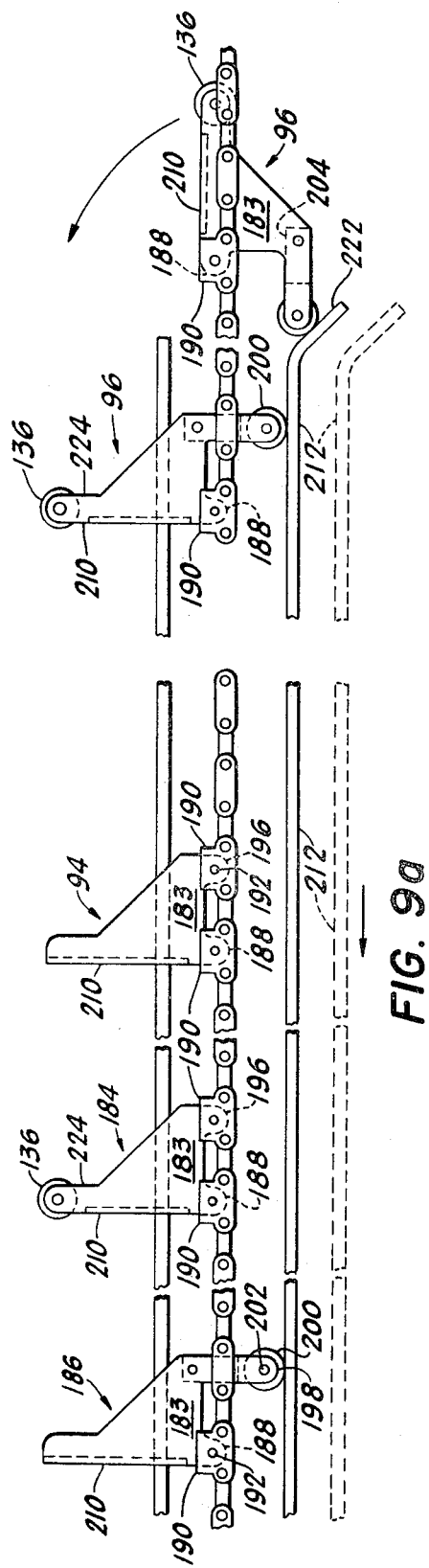
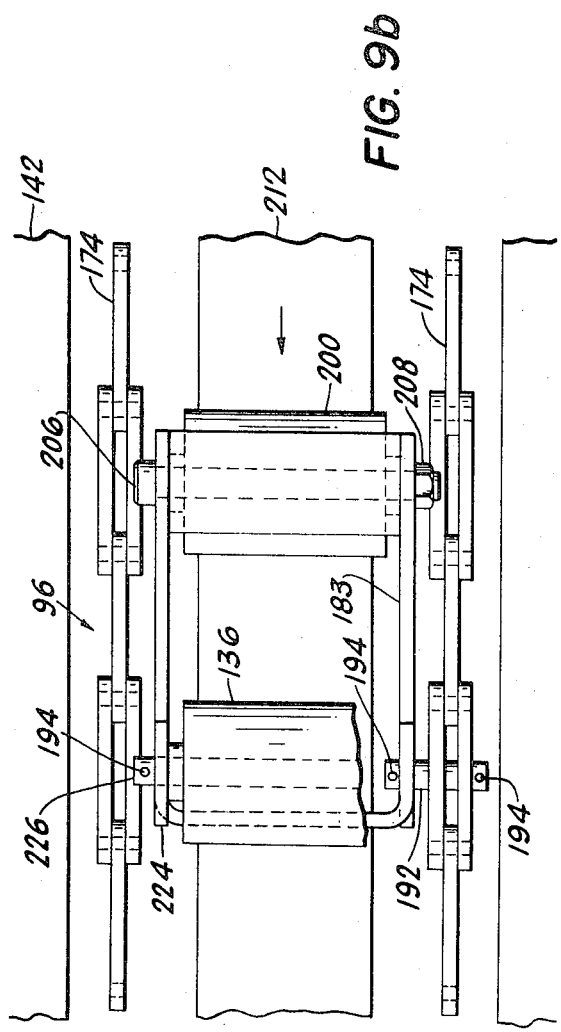
INVENTOR.
MIRCEA CALISTRAT
BY
his Attorney United States Patent Office 3,516,561
Patented June 23, 1970

3,516,561
METHOD FOR SEPARATING INTERLACED STACKS OF PAPERBOARD BLANKS
Mircea Calistrat, Baltimore, Md., assignor to Koppers Company, Inc., a corporation of Delaware
Original application Sept. 11, 1967, Ser. No. 666,605, now Patent No. 3,447,696, dated June 3, 1969. Divided and this application Nov. 27, 1968, Ser. No. 810,870
Int. Cl. B23p 19/00
U.S. Cl. 214—152           1 Claim

ABSTRACT OF THE DISCLOSURE

Apparatus for stacking alternate stacks of corrugated paperboard blanks discharged from a blank-forming machine face up and face down to reduce warping comprising an intermittently rotating transverse storage conveyor means for receiving and temporarily storing stacks of blanks in face-up position from an in-line conveyor adjacent the blank-forming machine; the intermittent conveyor means serving to feed the stacks of blanks so that any interlacing existing between adjacent stacks is separated, an inverter for sequentially receiving stacks from the storage conveyor and inverting alternate stacks to a face-down position on a rising conveyor comprising a guide for directing the stacks into a substantially vertical position with the stack resting on its leading edge on the rising conveyor where a pivoting finger carried by the rising conveyor engages the bottom edge of a first stack on the conveyor to advance it along the conveyor thereby positioning the first stack face up, an inverting lever adjacent the underside of a subsequent stack intermittently operable to engage the underside surface of this second stack to pivot it about its bottom edge so that it descends onto the rising conveyor with its underside up, first and second advancing fingers for sequential engagement with the trailing edges of the first and second stacks to advance them along the rising conveyor; a stacker for receiving stacks of blanks from the rising conveyor and stacking them one under the other to form a pile of blanks comprising a lifting conveyor including a stop for positioning each of the stacks, means for raising the lifting conveyor, with the stack thereon, a distance slightly greater than the height of the stack, a support for engaging the bottom face of the lifted stack to maintain the stack in its lifted position, means for lowering the lifting conveyor to receive another stack for repeating the foregoing lifting operation, and means rotating the lifting conveyor in its uppermost position when the pile of blanks reaches a selected height to discharge the pile on a skid or other conveyor for further handling.

---

This is a division of application Ser. No. 666,605, filed Sept. 11, 1967, now Pat. No. 3,447,696.

BACKGROUND OF THE INVENTION

Field of the invention

This invention relates generally to material or article handling and more particularly to article piling or arranging apparatus.

Description of the prior art

Corrugated paperboard blank-forming apparatus, commonly known as a corrugator, forms a continuous web of corrugated paperboard. Usually this web is longitudinally split into a plurality of parallel widths and each width is then cut laterally to form blanks of the material for making corrugated cartons such as boxes. The longitudinally advancing blanks are collected in stacks on a delivery conveyor which then discharges them transversely to the path of blank travel for manual stacking into piles on a skid or other conveyor.

Despite constant efforts to improve the quality of box blanks thus produced, the blanks still have a tendency to curl or warp, usually in a direction lateral to the web path. Warped blanks are difficult to process by further processing machinery. To reduce the amount of warp in the blanks, it is customary to stack them in large piles of smaller stacks of which smaller stacks are alternately placed face up and face down. In this matter, the warped portions of one stack oppose the warped portions of an alternate stack so that the weight of the pile tends to flatten the blanks.

Another inconvenience exists in that the advancing parallel adjacent blanks tend to become misaligned on the discharge conveyor so that the individual blanks of adjacent stacks become interlaced. Thus, the attendants are required to manually separate these piles into discrete stacks before alternate ones can be inverted.

Letchworth Pat. No. 3,297,174 discloses apparatus for inverting alternate small stacks of blanks. The Letchworth apparatus receives the stacks of blanks from the corrugator on a plurality of conveyor delivery belts which are parallel but are at different levels so that one series of blanks can be placed on another to form a larger stack which is thereafter inverted.

The parallel deliverly belts of Letchworth require individual height adjustment for supporting the parallel advancing blanks whose width may vary from order to order. A disadvantage of this arrangement is that the parallel streams of blanks exiting from the cut-off portion of the corrugator are frequently interlaced. Therefore, it is difficult for the blanks to drop to different levels as described by Letchworth. It is also observed that it would be difficult to maintain the height of the final pile since it is formed by adding stacks to the top of the pile. Finally, turning alternate stacks of very large blanks 180 degrees in one continuous motion requires considerable energy because of the large air resistance encountered by the blanks during such movement.

SUMMARY

The present invention provides apparatus for automatically forming a pile of alternately inverted stacks of blanks which pile may be of unlimited height. The apparatus is adaptable for use in conjunction with existing delivery conveyors without the need for complex adjustments. The apparatus includes a transverse storage conveyor adapted to receive stacks of blanks from a corrugator delivery conveyor; an inverting apparatus for receiving consecutive individual stacks of blanks from the storage conveyor in a manner to stand the stacks on their leading edge, including an off-setting device for off-setting alternate ones of the stacks relative to the other ones of the stacks across their length, and a first pivoting means for pivoting a first stack about its upstanding trailing edge to position the stack on a rising conveyor with its top face up and a second pivoting means for pivoting a second stack about its leading edge to position the stack on the rising conveyor with its top face down; and a stacking mans for receiving alternately inverted stacks from the rising conveyor and forming them in a pile one under the other by a lifting means for lifting each stack consecutively into engagement with a pile support means, the lifting means operable to discharge a pile of blanks of selected height onto subsequent processing apparatus.

The above and further objects and novel features of the invention will appear more fully from the following detailed description when the same is read in connection

DESCRIPTION OF THE DRAWINGS

In the drawings wherein like parts are marked alike:

FIG. 9a is an elevational view of a portion of the rising conveyor illustrating the types of pivoting fingers and advancing fingers used to pivot a first stack of blanks and advance both first and second stacks of blanks;

FIG. 9b is a plan view in partial cross-section of one of the pivoting fingers of FIG. 9a illustrating its connection to the chains used on the rising conveyor;

THE PREFERRED EMBBODIMENT

In the manufacture of corrugated blanks, a web of corrugated paperboard is formed and then slit into a number of parallel streams of desired width. These streams are subsequently cut transversely to form parallel streams of blanks. The cutting operation, by its nature, inherently has a tendency to skew the blanks so that they are not exactly parallel to the flow of blanks. Accordingly, overlapping of the blanks between the parallel stream occurs. This overlapping is commonly known as interlacing. Stacks of interlaced blanks are illustrated in FIGS. 1 and 4.

Figure 1:
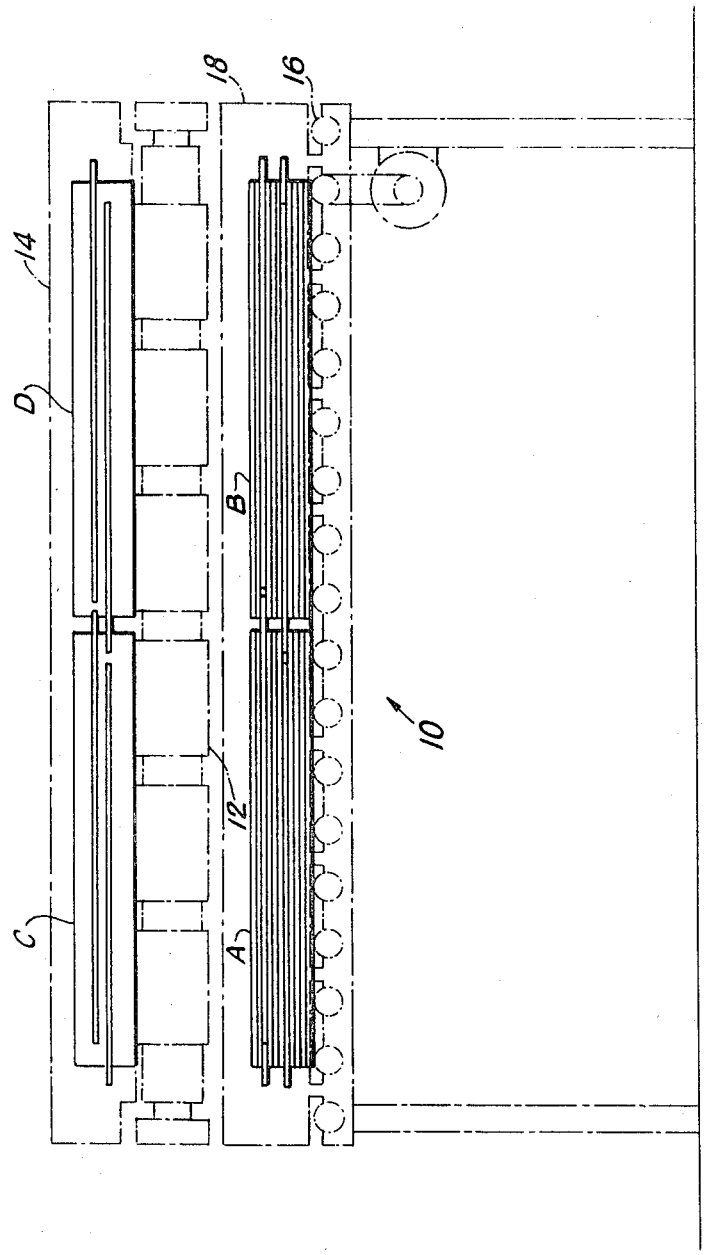
FIG. 1 is a diagrammatic front elevation of a conventional delivery conveyor illustrating the usual discharge of interlaced blanks.
Figure 4:
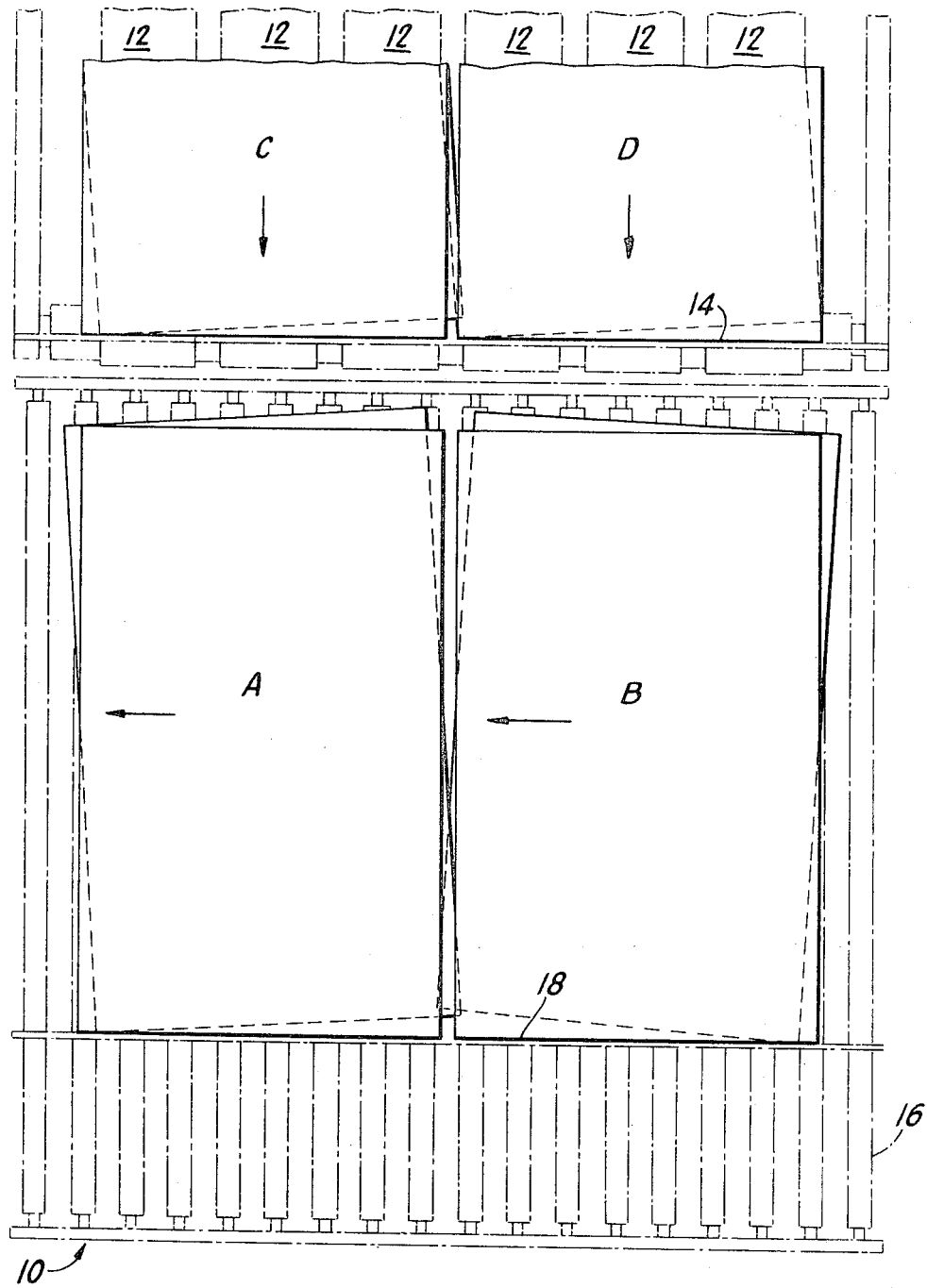
FIG. 4 is a plan view of FIG. 1.

Referring now to FIGS. 1 and 4, piles of interlaced blanks A and B and shingled blanks C and D (a portion of one blank resting upon the next adjacent lower blank) are shown preparatory to lateral discharge from a conventional delivery conveyor, generally designated 10, of a corrugator (not shown). Delivery 10 may be of the type shown in Lopez Pat. No. 3,079,150 which includes belts 12 for advancing the blanks downstream in shingled fashion where they are temporarily halted by a gate 14. Beyond gate 14, delivery 10 includes a plurality of longitudinally mounted rollers at a lower elevation than belts 12. When gate 14 is removed from the leading edges of the shingled blanks C and D, they are advanced by belts 12 causing them to fall one on top of the other upon rollers 16 to form piles A and B. A back-stop 18 is provided to halt the forward progress of the blanks and is adjustable upstream and down to accommodate the length of blanks being handled. Hereinafter, the "length" of the blanks on stacks refers to their longitudinal dimension along the delivery 10 as viewed in FIG. 4.

When piles A and B reach a selected height, gate 14 is moved to intercept the flow of blanks C and D. Thereafter, rollers 16 are driven to discharge the piles A and B upon a storage conveyor assembly generally designated 20. When pile B is completely clear of delivery 10, the foregoing process is repeated.

Although only two parallel streams of blanks are shown, it is not uncommon to have the initially formed web slit into four and sometimes as many as seven streams. The slit web is usually divided into an equal number of narrower webs of which one-half are guided into an upper cut-off knife and the other half into a lower cut-off knife. The shingled blanks C and D are discharged from one of the knives. Another delivery 10 is provided to handle the discharge from the other knife. Either or both deliveries 10 may be provided with the present invention which is illustrated herein to handle four streams from each delivery at maximum corrugator speed and more at lesser corrugator speeds.

STORAGE CONVEYOR

In accordance with the invention, the blanks coming from the delivery conveyor 10 are received by a storage conveyor 20. The length of storage conveyor assembly 20 exceeds the width of delivery conveyor 10 so that regardless of the number of piles on delivery 10, conveyor 20 is capable of receiving all of them.

The function of conveyor assembly 20 is to store the stacks received from delivery 10 and load them one at a time into the inverting mechanism 22 where stack A will be pivoted into face-up position and stack B will be pivoted into face-down position. Hereinafter, the "face" of the stack refers to its top surface as it is discharged from conveyor 10. The "underside" of the stack refers to its bottom surface as it is discharged from conveyor 10.

Conveyor assembly 20 includes a storage conveyor 24 and a loading conveyor 26. Both conveyors 24 and 26 are intermittently driven simultaneously. However, when conveyor 24 is not driven, it is capable of free-wheeling whereas conveyor 26 will remain stationary. Thus, it can be seen that stack A will be loaded into inverter 22 upon rotation of conveyor 26 and, since conveyor 24 also rotates, stack B will move forward into the position previously occupied by stack A thereby leaving conveyor 24 clear to receive subsequent stacks from delivery 10 when it is rotated for discharging. These subsequent stacks will advance upon the free-wheeling conveyor 24 by momentum induced by rollers 16 of the delivery 10 until they rest against the stack B being held in stationary position by conveyor 26. In this manner, the timing of conveyor assembly 20 is independent of the timing of the discharge from delivery 10, the only requirement being that conveyor 20 discharges the stacks faster than it receives them as otherwise the stacks coming in from delivery 10 would shove the stack A off.

As mentioned above, conveyors 24 and 26 are driven simultaneously. Thus, stack A, for example, advances beyond conveyor 26 and falls into inverter 22. As stack A falls into inverter 22, the interlacing of blanks between stacks A and B is broken leaving stack B as a discrete stack on conveyor 26. The interlacing of the stacks is broken when the center of stack A passes over the end of conveyor 26, which causes the trailing edge of stack A to rise, and falls into inverter 22. Thus, it can be seen that the bending occurring between the stacks as stack A falls into the inverter breaks the interlacing. This is advantageous since merely attempting to break the interlacing by pulling the stacks apart in a straight line is often ineffective because blanks near the top of the stacks tend to follow one another.

Storage conveyor 24 adjacent the discharge side of delivery 10 receives piles of blanks A and B therefrom. Conveyor 24 comprises spaced frame portions 28a, 28b and 28c between which a plurality of rollers 30a and 30b are bearing mounted in the conventional manner at an elevation substantially equal to the elevation of rollers 16 of delivery 10. Frame portion 28b is located near the center between frame portions 28a and 28c to support the inboard ends of rollers 30a and 30b. The only difference between rollers 30a, 30b is their length as illustrated. By supporting them near the center, there is less tendency for them to sag. If desired, rollers 30a, 30b may have identical lengths.

Figure 5:
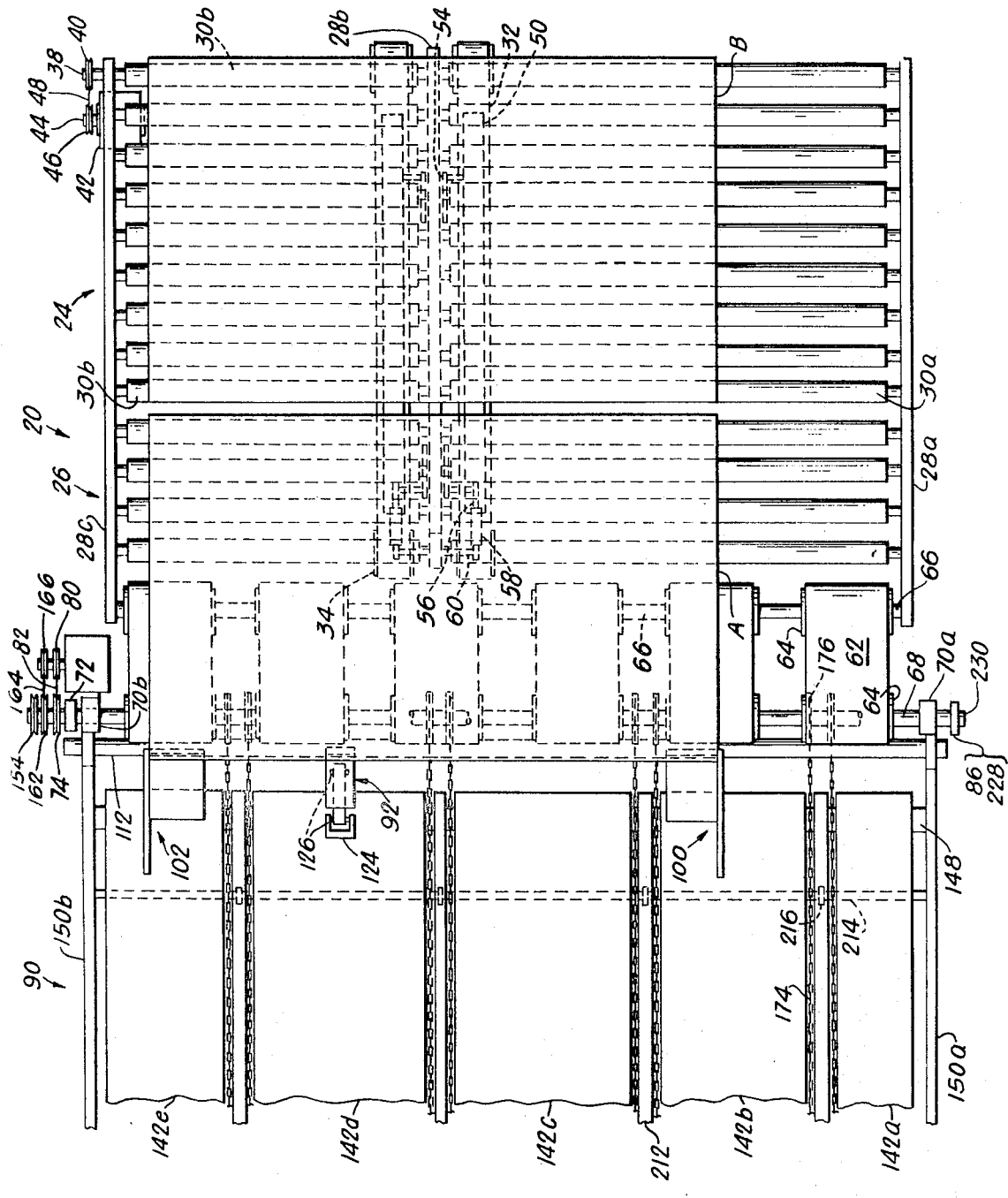
FIG. 5 is a plan view of FIG. 2.

Rollers 30a, 30b are driven at the desired interval of time by a pair of driven endless belts 32 positioned under the rollers, one of which is adjacent either side of frame portion 28b. Belts 32 encircle pulley wheels 34 mounted for rotation with pulley shafts 36a and 36b which are bearing mounted between frame portions 28a, 28b and 28c in a fashion similar to rollers 30a, 30b. One of rollers 30b, FIG. 5, has an extension 38 extending through frame portion 28c upon which is mounted a chain sprocket 40. A motor 42 is mounted in a known manner to frame portion 28c and has an output shaft 44 upon which is mounted a chain sprocket 46. A roller chain 48 encircles sprockets 40 and 46 for driving the pulley shafts 36a, 36b. The pulley shafts 36a and 36b are connected where they are supported by frame portion 28b so that both belts 32 are driven thereby.

Rollers 30a, 30b are driven by raising the upper run of belts 32 into frictional engagement with their lower surfaces. To raise belts 32, a belt lifting bar 50 is provided beneath the upper runs of the belts which lifts the upper run against the rollers. Lifting bars 50 are pivotably mounted to frame portions 52 by levers 54 having conventional pin connections 55 for attaching the levers to the bars and to the frame portions. One of levers 54 for each lifting bar 50 has an extension 56 for connection with an air operated ram 58 pivotably connected to frame portion 28b. Conventional clevis connections 60 may be used to connect the extensions 56 to the rams and the rams to the frame portions.

Figure 2:
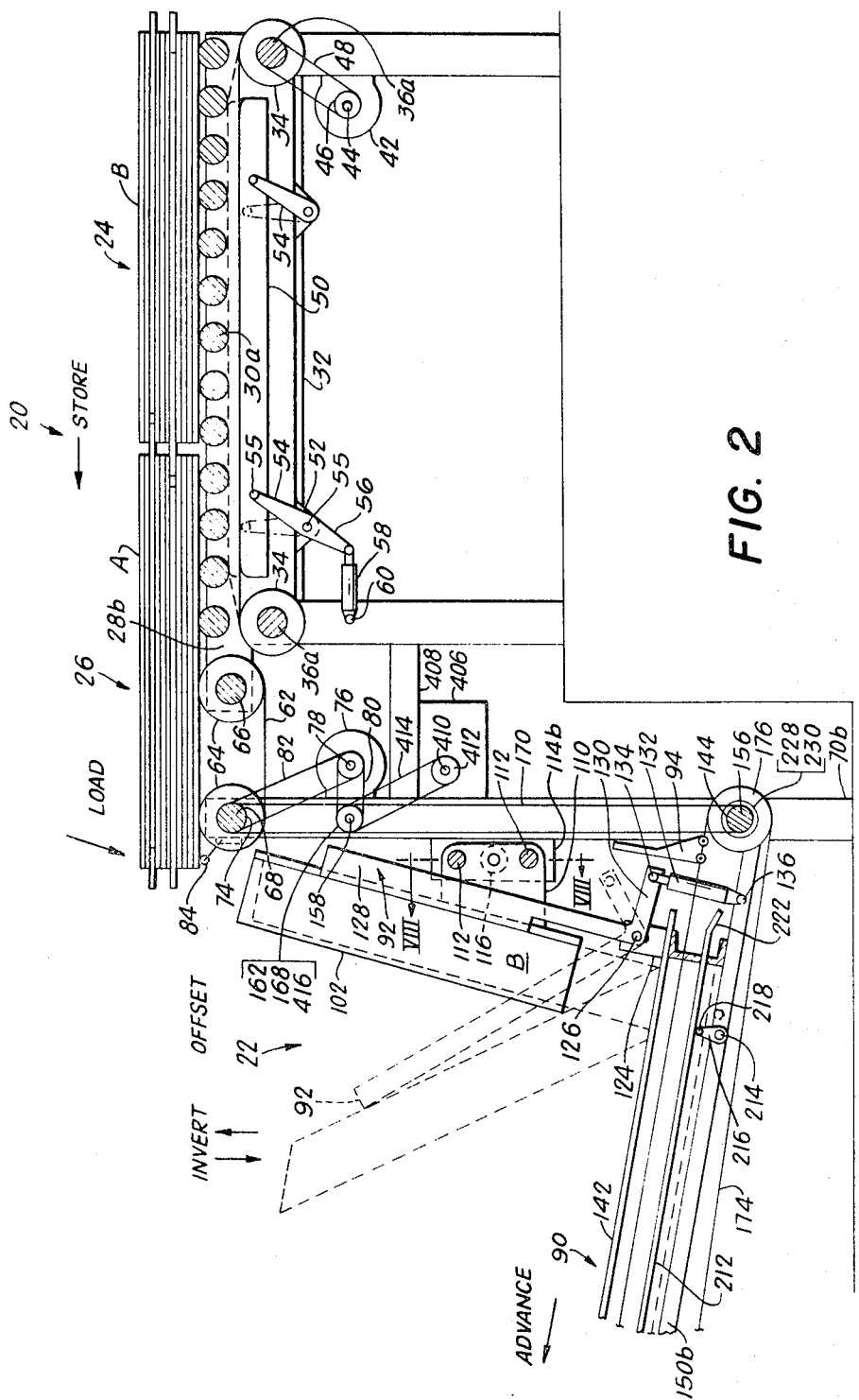
FIG. 2 is a diagrammatic side elevation of an embodiment of the storage and loading conveyors and inverting mechanism illustrating stacks stored on the conveyor and a second stack being pivoted toward a top face-down position on the rising conveyor.

As best illustrated in FIG. 2, as rams 58 are activated, they will extend and pivot extensions 56 about their pin connections thereby raising lifting bars 50 to the position shown by the dotted lines. In this latter position, belts 32 are pressed into driving engagement with rollers 30a, 30b. Motor 42 runs continuously. Rams 58 are simultaneously energized by a signal from inverting mechanism 22, as will be later explained, to advance the stacks A and B with stack A being loaded into the inverting mechanism.

LOADING CONVEYOR

Loading conveyor assembly 26 is adapted to discharge stack A, as illustrated in FIG. 2, into inverter 22 and simultaneously place stack B into the position previously occupied by A. Conveyor 26 comprises a plurality of endless belts 62 spaced side by side across the width of the assembly and surrounding pulley wheels 64 secured for rotation on shafts 66 and 68. Shaft 66 is bearing mounted between frame portions 28a, 28c and drive shaft 68 is bearing mounted between frame portions 70a, 70b. Shaft 68 extends beyond frame portion 70b and has a conventional pneumatically energized clutch 72 mounted thereon. Clutch 72 may be, for example, a Model LW, made by Horton Manufacturing Co., Minneapolis, Minn., which includes an integrally mounted V-belt sheave 74. Drive shaft 68 is driven through clutch 72 by a motor 76 having an output shaft 78 upon which a V-belt sheave 80 is mounted for rotation, the sheaves 74 and 80 being connected by V-belt 82. Motor 76 is conveniently mounted to frame portion 70b. Preferably, a speed reducer (not shown) is placed between clutch 72 and shaft 68 in the known manner so that clutch 72 can be run at high speed by a conventional high speed motor.

Motor 76 runs continuously. Clutch 72 is selectively energized by a signal from inverter 22, as will be later explained. When clutch 72 is energized, belts 62 are rotated and stack A advances generally horizontally until its center of gravity passes beyond the return of belts 62 around pulleys 64. At this time, stack A pivots about pulleys 64 and drops, leading edge downward, into inverter 22. Simultaneously, rams 58 have been activated and accordingly stack B advances onto conveyor 26 until it trips a pneumatic valve 84 which deactivates rams 58 and clutch 72.

Shaft 68 also extends beyond frame portion 70a and has a conventional pneumatically energized shaft-mounted brake 86 mounted thereon and held against rotation in the known manner. Brake 86 may be, for example, a Model K diaphragm type, made by Horton Manufacturing Co., Minneapolis, Minn. Brake 86 is energized when valve 84 is tripped by an advancing stack so that belts 62 cease rotating immediately, as clutch 72 is de-energized, to prevent the stack from advancing too far beyond the pulleys 64 on shaft 68.

INVERTER AND OFF-SETTING ASSEMBLIES

Inverter assembly 22 receives individual stacks of blanks and inverts alternate ones of the stacks to a face-down position upon a rising conveyor assembly 90. The remaining stacks are placed on conveyor 90 in a face-up position.

Figure 8:
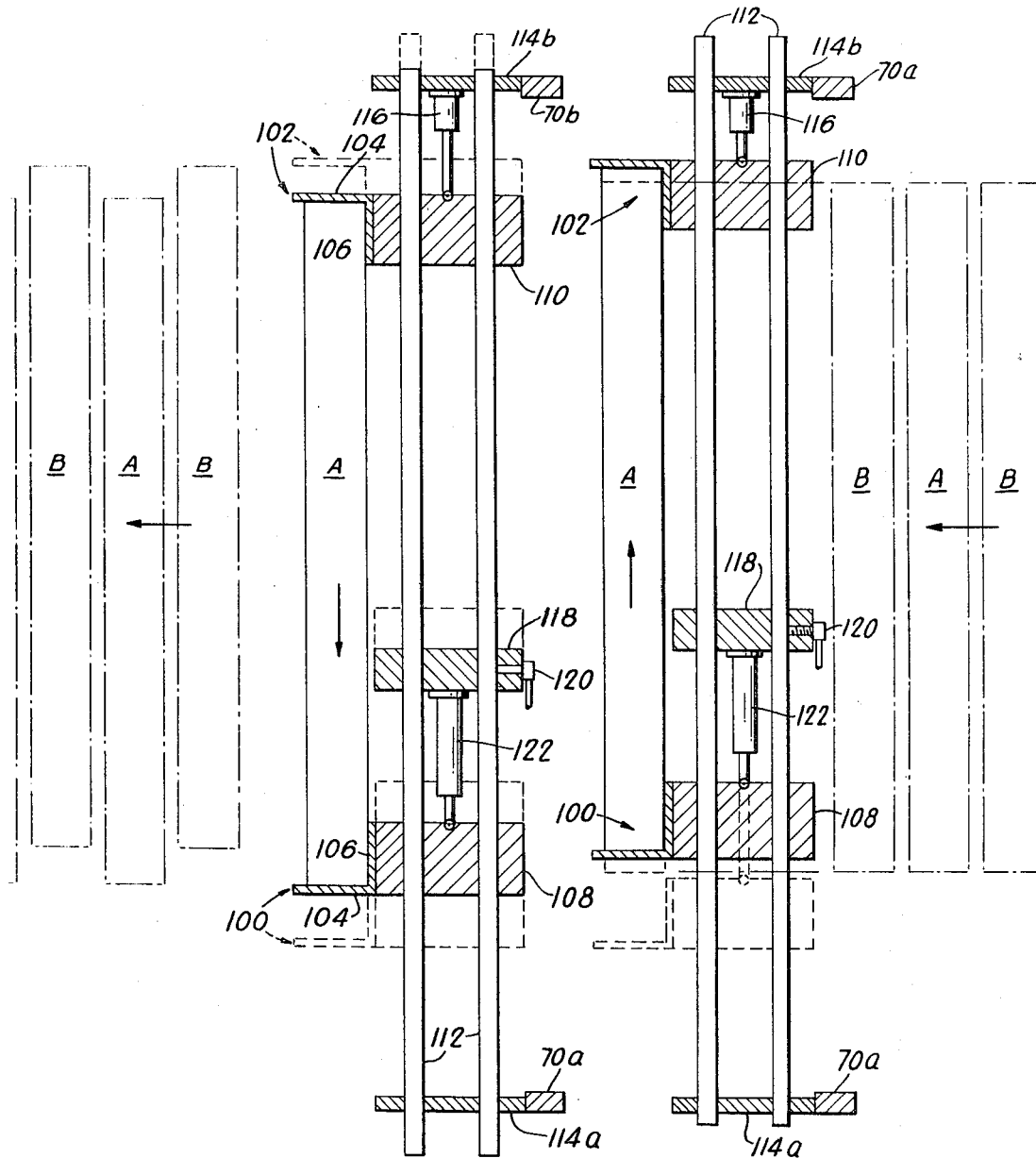
FIG. 8 is a section view taken along the line VIII—VIII of FIG. 2 illustrating an off-set mechanism for laterally off-setting alternate stacks of blanks.

Inverter 22 also offsets alternate stacks in a lateral direction as illustrated in FIG. 8. This off-set condition contributes to ease of handling of the stacks in subsequent processing operations, providing a gripping surface which the attendants may use in moving the stacks.

As best illusrtated in FIG. 2, a stack B is inverted to a face-down position by pivoting the stack B about its leading edge, as shown by the dotted lines. Pivoting is accomplished by an inverting lever 92 adjacent the bottom face of stack B. After stack B has been laterally offset, lever 92 is actuated to pivot the stack about its leading edge so that it falls face down upon conveyor 90. Thereafter, stack B is advanced along the conveyor by an advancing finger 94 and stack A (now on the conveyor 26) is discharged into inverter 22 by loading conveyor 26.

Figure 7:
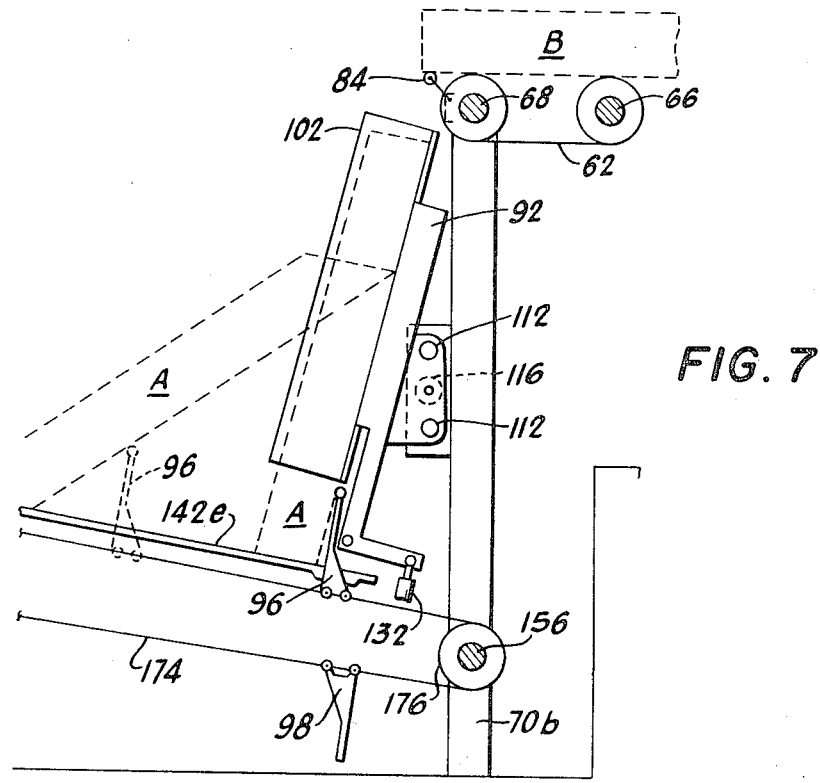
FIG. 7 is a partial view of the inverting mechanism of FIG. 2 illustrating a first stack being pivoted toward a top face-up position on the rising conveyor.

Stack A, FIG. 7, is pivoted about its trailing edge by a roller finger 96, as shown by the dotted lines so that it falls face-up on rising conveyor 90. Thereafter, stack A is advanced by a subsequent advancing finger 98.

Figure 11:
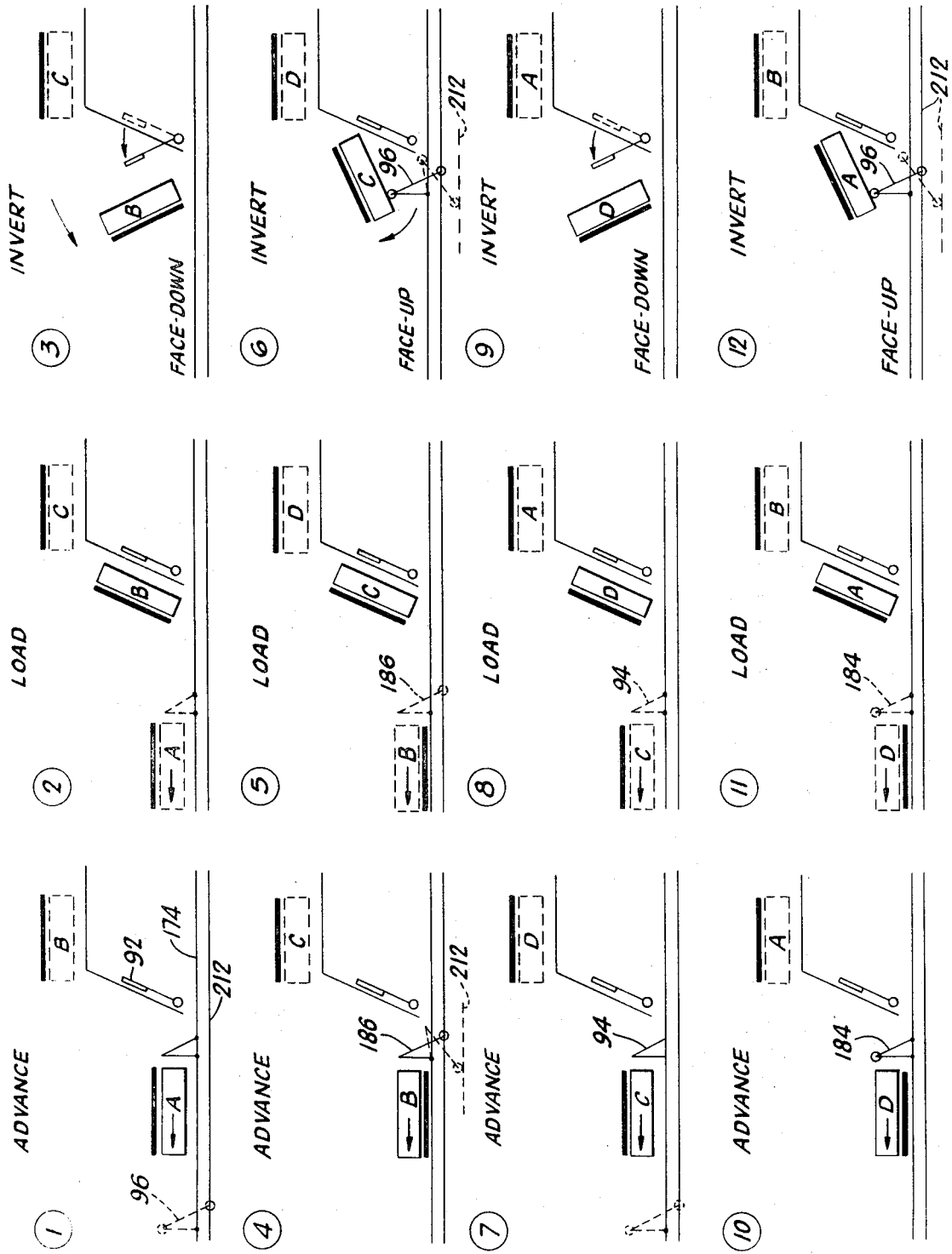
FIG. 11 is a schematic illustration of the sequence of pivoting the stacks in the inverting mechanism into alternate face-up and face-down positions.

FIG. 11 illustrates, in panels ① through ⑫, the inverting sequence of four stacks A, B, C and D. The stacks are lettered and the heavy line adjacent the face of the stacks indicates the relative face positions of the stacks during operation of inverter 22 and rising conveyor 90. Certain of the roller and advancing fingers are disengaged when extra-width stacks are being handled. This feature will be subsequently described. Coincidentally, reading panels ①, ④, ⑥ and ⑩ vertically shows the stacks A, B, C and D to be alternately inverted to face-up and face-down positions.

Inverter assembly 22, FIGS. 2 and 8, comprises side guides in the form of upright angles 100 and 102 for receiving the stacks as they fall from loading conveyor 26. Each of the guides has a side leg 104 for engaging the ends of the stacks and a bottom leg 106 engaging the underside of the stacks to support them in an upright position. Slide block 108 secured to leg 106 of guide 100 and mounting block 110 secured to leg 106 of guide 102 support the guides on a pair of support rods 112.

OFF-SETTING ASSEMBLY

Support rods 112, FIG. 8, are slidably mounted in brackets 114a and 114b provided on frame portions 70a, 70b. Mounting block 110 is secured in a convenient manner to rods 112. A pneumatic ram 116 is connected in a conventional manner to both mounting block 110 and to bracket 114b so that, when ram 116 is actuated, block 110, and consequently guide 102, moves laterally with respect to bracket 114b.

Guide 100 is secured to slide block 108 which is free to slide along rods 112. A base block 118, similar to mounting block 110, is movably mounted on rods 112 inboard of slide block 108. Base block 118 is locked against one of rods 112 by a clamp screw 120. A pneumatic ram 122 is connected in a conventional manner to both base block 118 and slide block 108 so that, when ram 122 is actuated, block 108, being sildable on rods 112, moves laterally with respect to base block 118, carrying guide 100 with it. Base block 118 can be positioned and clamped along rods 112 to place guide 100, through ram 122, in the correct position for acting on the stacks. In this manner, adjustment is provided to compensate for stacks of various lengths.

FIG. 8 is a section taken along lines VIII—VIII of FIG. 2 except that the stacks are pictured as all standing on end to better illustrate the manner in which they are offset. Thus, the stacks are shown entering the inverter 22 with their lateral edges or ends in substantial alignment, it being understood that some of the individual blanks may be slightly askew.

The right-hand portion of FIG. 8 illustrates the position of guides 100, 102 prior to and after acting upon stack A. The left-hand portion illustrates the position of the guides prior to and after operating on stack B. The extreme left-hand portion illustrates the relative lateral offset positions of stacks A and B after the off-setting operation.

Referring to the right-hand portion of FIG. 8, guide 102 is in the position shown prior to receiving stack A from conveyor 26. Leg 104 of guide 102 is spaced a short distance from the edge of stack A as it enters inverter 22. Leg 104 of guide 100 is in the position indicated by the dotted lines, being placed in this position by the extension of ram 122 and being spaced a short distance from the edge of stack A. After stack A has entered inverter 22, ram 122 is actuated thereby pulling guide 100 against stack A and moving it against guide 102. Ram 122 is immediately actuated in the reverse direction returning the guide 100 to its original position. Accordingly, stack A is unrestrained so that it may be pivoted about its trailing edge by roller finger 96 and thus fall face up on rising conveyor 90.

After stack B has entered inverter 22, as shown in the left-hand portion of FIG. 8, guide 100 is again actuated in the same manner as for stack A thereby moving stack B against guide 102, guide 102 being in the position indicated by the dotted lines. Simultaneously, ram 116 is actuated which moves rods 112 to the left as shown by the dotted lines. Base block 118, being clamped to rods 112, moves to the left pushing slide block 108, via ram 122, to the position shown. In this manner, stack B is squared against guide 102 and also offset to the left with respect to stack A. When stack B reaches its off-set position, ram 116 is retracted and ram 122 is extended to return guides 100 and 102 to their previous positions ready to receive subsequent stack A.

INVERTER ASSEMBLY

After each stack A or B has been offset, stack A is inverted to a face-up position and stack B is inverted to a face-down position. As previously mentioned, stack A is pivoted about its trailing edge by a roller finger 96 and then advanced along rising conveyor 90 by advancing finger 98. Stack B is pivoted about its leading edge by inverting lever 92 and then advanced along rising conveyor 90 by advancing finger 94.

The inverting lever 92 is pivotably supported between a clevis bracket 124 by a pin 126 passing through lever 92 and bracket 124. Bracket 124 is secured to rising conveyor 90. Lever 92 includes an upstanding leg portion 128 which, in its retracted position, is on the same plane with the leg portions 102 of guides 100 and 102. That is, leg 128 lies immediately behind the bottom face of a stack A or B in the inverter 22. Lever 92 includes a short leg 130 formed at a right angle with leg 128 and connected to a pneumatic ram 132 by a conventional pin connection 134. Ram 132 is pivotably secured to rising conveyor 90 by a similar pin connection 136. After a stack B in the inverter 22 has been offset, as previously described, ram 132 is actuated thereby pivoting lever 92 about pin 126 as shown by the dotted lines in FIG. 2. Upstanding leg 128 pushes against stack B thereby pivoting it about its leading edge so that it falls face down on conveyor 90. Thereafter, advancing finger 94 is moved forward to engage the trailing edge (previously the leading edge) of stack B and advance it along conveyor 90. Simultaneously, ram 132 is retracted to return lever 92 to its original position.

To invert a stack A in inverter 22 to a face-up position on conveyor 90, a roller finger 96 is advanced against the lower portion of the back of stack A after the stack has been offset. A small roller 136 carried by finger 96 pushes against the stack thereby moving its leading edge forward and letting its trailing edge slide down the leg portions 106 of guides 100 and 102. The end result is that stack A is generally pivoted about its trailing edge until it rests on conveyor 90. As the stack slides down onto conveyor 90, finger 96 continues to advance along the conveyor, with the small roller 136 rolling along the bottom of the stack, until finger 96 is forward of stack A. Thereafter, advancing finger 94 is moved forward to engage the trailing edge of the stack and advance it along conveyor 90.

RISING CONVEYOR

Figure 3:
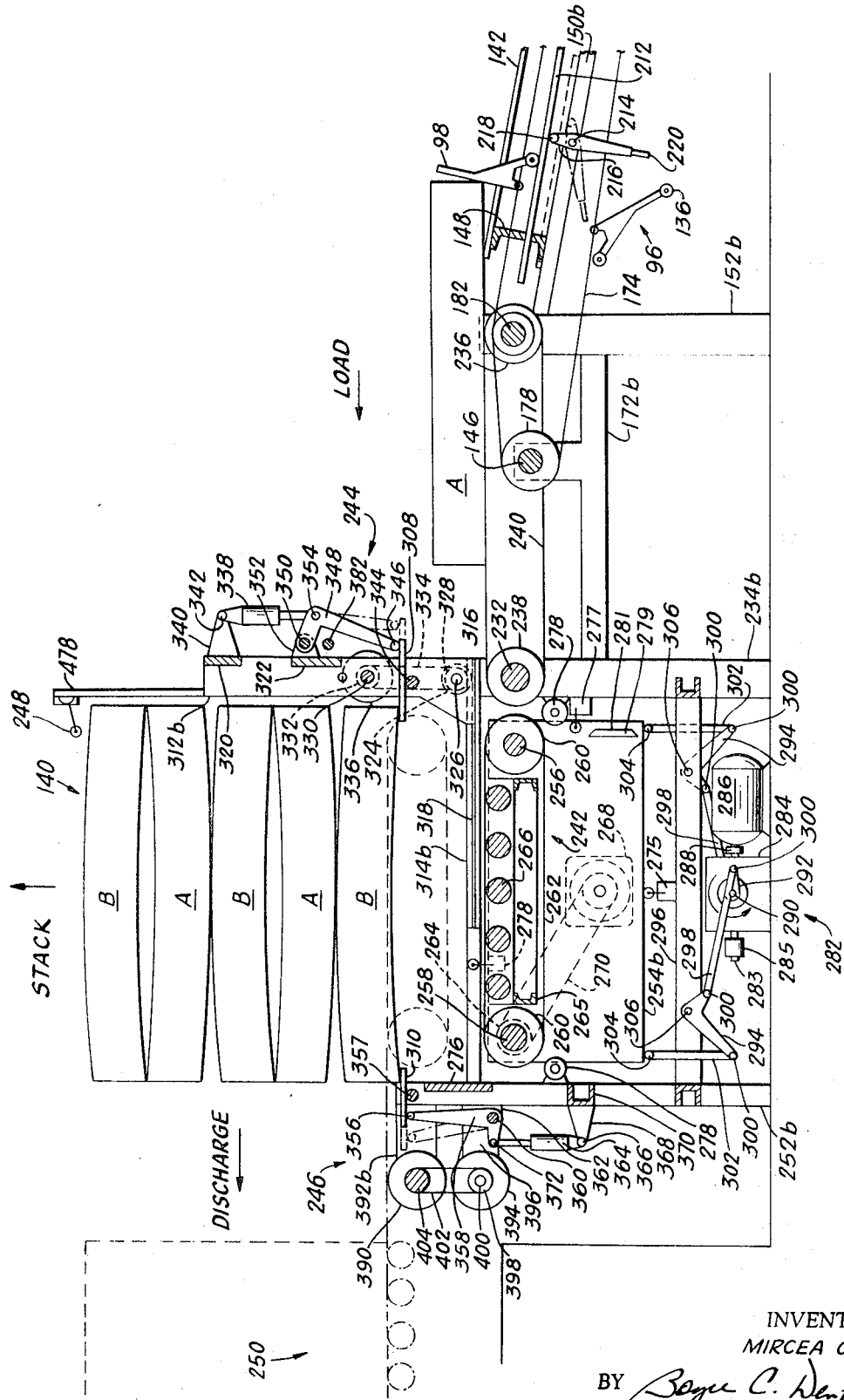
FIG. 3 is a diagrammatic side elevation of an embodiment of the rising conveyor and stacking mechanism illustrating a pile of alternately inverted stacks of blanks being formed.

Rising an advancing conveyor 90 advances the off-set and inverted stacks to an entry conveyor 138 from which the stacks are discharged into a stacker portion 140. Conveyor 90 comprises a plurality of stack supports 142a, b, c, d and e extending substantially between a lower sprocket shaft 144 and an upper sprocket shaft 146. As best illustrated in FIGS. 2 and 3, supports 142 are mounted upon a pair of cross-members 148 which have their ends supported by longitudinally extending frame members 150a, 150b secured to upstanding frame portions 70a, 70b and 152a, 152b.

Sprocket shaft 144 is rotatably mounted between frame portions 70a, 70b and has an extended portion 154 extending beyond frame portion 70b upon which is mounted a pulley wheel 156. A speed reducer 158 is mounted on frame portion 70b and carries a clutch 160 thereon, the clutch being substantially identical to clutch 72 previously described. Clutch 160 is driven by the rotation of speed reducer 158 which is in turn rotated by a pulley wheel 162 mounted thereon connected by a V-belt 164 to a pulley wheel 166 mounted on output shaft 78 of motor 76. An output pulley wheel 168 on clutch 160 drives pulley wheel 156 through a V-belt 170 and thereby rotates sprocket shaft 144.

Upper sprocket shaft 146 is rotatably mounted between frame portions 172a, 172b of entry conveyor 138. Pairs of roller chains 174 located in spaces provided between stack supports 142 encircle sprockets 176 and 178 mounted respectively on the lower sprocket shaft 144 and upper sprocket shaft 146. The path traveled by the upper runs of chains 174 carries them over sprockets 180 secured to pulley shaft 182 of entry conveyor 138 for driving shaft 182.

As best illustrated in FIGS. 9a and 9b, each pair of chains 174 carries roller fingers 96 and advancing fingers 94 therebetween so that the fingers travel with the chains. Four kinds of fingers, 94, 96, 184, and 186 are used. Each of the fingers includes a U-shaped body portion 183 as viewed in FIG. 9b, having a lug portion 188 on each leg thereof extending beside the adjacent chain 174. Chain 174 includes a link 190 extending upward so as to overlap lug portions 188. Pins 192 extend through holes provided in both the lugs 188 and links 190 to pivotably support the fingers to the chains. Pins 192 are retained by cotter pins 194.

Fingers 94 and 184 also include lug portions 196 similar to and spaced from lugs 188 to overlap a subsequent link 190 in chain 174. Pins 192 likewise connect lugs 196 to links 190 so that fingers 94 and 184 will not pivot about pins 192 in lugs 188.

Fingers 96 and 186 include lug portions 198 extending beneath chains 174 between which a roller 200 is carried by a pin 202 passing through the roller 200 and lugs 198. Pin 202 is retained by cotter pins 194. Thus, it can be seen that fingers 96 and 186 are free to pivot about pins 192 in lugs 188 as indicated in the right-hand portion of FIG. 9a. A counterweight 204 is secured between the legs of the U-shaped body portion of fingers 96 and 186 by a bolt 206 and a nut 208 clamping the legs against the counterweight. The counterweight causes the stack engaging faces 210 of the fingers to lie substantially flat with respect to the chains 174 as viewed to the extreme right of FIG. 9a.

Referring now to FIGS. 2 and 3, conveyor 90 also includes a roller support 212 beneath the upper run of each pair of chains 174 for engaging rollers 200 of fingers 96 and 186 to maintain the fingers in an upright position as viewed in FIG. 9a. However, roller supports 212 may be lowered to the position shown by dotted lines in FIGS. 2, 3, 9a, and 11. When in the lowered position, fingers 96 and 186 will lie flat as previously explained.

Lowering of roller supports 212 is accomplished by pivotably supporting them on frame members 150a, 150b. Pivot rods 214 are provided between frame members 150a, 150b. Pivot rods 214 are provided between frame members 150a, 150 with pivot arms 216 secured thereto in a position beneath roller supports 212. Pivot arms 216 are connected to the supports 212 by a conventional pin connection 218 which allows the supports to swivel with respect to the pivot arms. Thus, when the pivot arms 216 are rotated clockwise, as viewed in FIGS. 2 and 3, the roller supports 212 will be lowered to the position indicated by the dotted lines. An operating lever 220 is provided on one end of one of pivot rods 214 for rotating the rod. A suitable clamp (not shown) is provided to lock the pivot rod in the desired position when the supports 212 are in either the raised or lowered position.

Thus, it can be seen that when the supports 212 are in the lower position, fingers 96 and 186 will traverse the upper run of chains 174 in a flat position, as viewed in FIG. 9a, since rollers 200 do not contact the supports 212. However, when supports 212 are in the raised position, rollers 200 will flip the fingers 96 and 186 into an upright position as they approach the supports 212. A lead-in portion 222 on supports 212 aid in pivoting the fingers to an upright position. Fingers 96 and 186 merely hang free from pins 192 during the traverse of chains 174 along the lower run between the sprockets 176 and 178.

The length of rising conveyor 90 is made to accommodate the widest stack to be handled. As viewed in FIGS. 2 and 3, which may conveniently be joined to give a complete picture of conveyor 90, stack A is being discharged onto entry conveyor 138 as stack B is being inverted to fall face down on conveyor 90. Thus, sufficient space must be allowed between finger 98 and the finger 94 approaching inverter 22. For example, if the maximum width stack to be handled is five feet, a space of about six feet is required between the fingers. However, if the stack width is less than half the maximum width, that is, two and one-half feet or less, obviously two stacks can be accommodated between fingers 98 and 94. This explains the reason for providing some of the fingers with rollers 200 supported by roller supports 212.

FIG. 11 illustrates stacks of two and one-half feet or less being processed. For stacks A and C two fingers are required; roller finger 96 to invert the stack to a face-up position and advancing finger 94 to advance the stack along the conveyor. On the other hand, stacks B and D require only an advancing finger 186 to advance it along the conveyor. Thus, three fingers are required for each "set" of stacks A–B and C–D. Since a set of narrow stacks can be accommodated simultaneously on conveyor 90, obviously another set of three fingers can be carried on the lower run of chains 174. Accordingly, a total of six fingers are provided at the proper sequential spacing on chains 174. However, appropriate ones of the fingers may be lowered to an inoperative position by lowering roller supports 212 so that only three fingers remain upright for handling stacks wider than two and one-half feet.

Obviously, lowering three adjacent fingers will leave three fingers upright at a short spacing. Therefore, selected ones of the fingers are lowered to leave three fingers upright at the required spacing for wide stacks. FIG. 11 illustrates in dotted lines those fingers to be lowered when wide stacks are handled.

As previously mentioned, finger 96 is provided with a roller 136 to permit the finger to pass beneath stack A after the stack has been inverted thereby. Finger 184 is likewise provided with a roller 136. Roller 136 is carried between upstanding lug portions 224 of fingers 96 and 184 by a pin 226 passing through both the roller 136 and lugs 224. Cotter pins 194 retain pin 226, as illustrated in FIG. 9b.

Although the foregoing arrangement of conveyor 90 has been described for wide stacks of from two and one-half to five feet and narrow stacks of two and one-half feet and less, obviously, the proportions may be designed to handle other size stacks which may be manufactured.

Conveyor 90 normally run continuously. However, in the event that a stack is not present in loading conveyor 26, a signal is provided to disengage clutch 160 so that conveyor 90 is not driven. The signal also energizes a brake 228 (similar to brake 86) carried by an extension 230 on sprocket shaft 144 extending beyond frame portion 70a. The signal will be discussed further in the control portion of the specification. Brake 228 is used to stop the chains 174 immediately after the signal is received so that the fingers will remain in timed relation to loading conveyor 26. Otherwise, a stack could be loaded in inverter 22 with the fingers in the wrong position to maintain the inverting sequence.

ENTRY CONVEYOR

Entry conveyor 138 removes stacks of blanks from conveyor 90 at a slightly faster speed than they are traveling so that they move away from the advancing finger to allow the finger to clear the stack as it passes over sprocket 180 and thereafter around sprocket 178. The stacks are also made level for entry into stacker 140.

Figure 6:
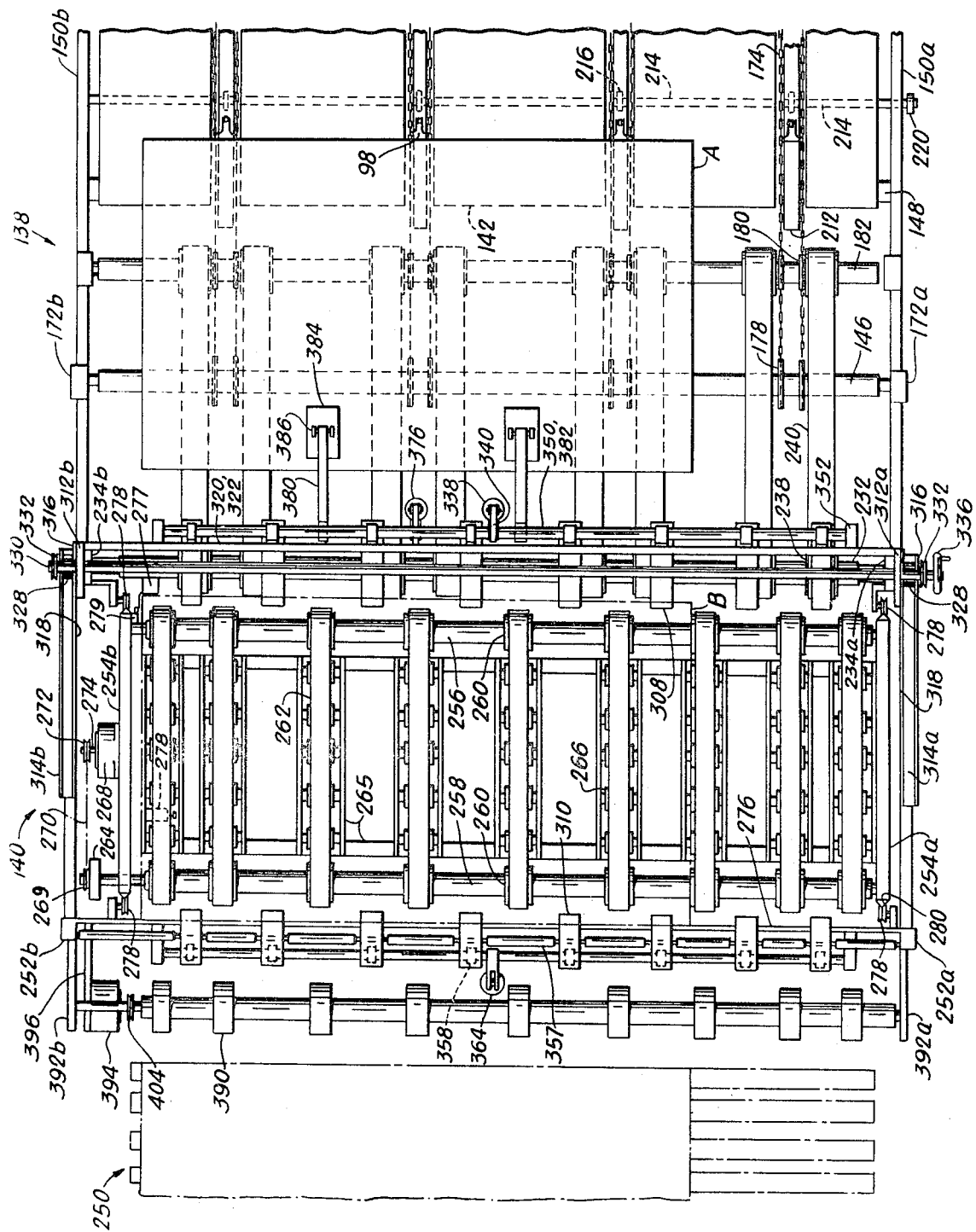
FIG. 6 is a plan view of FIG. 3.

Conveyor 138 comprises a pulley shaft 182 mounted for rotation between frame portions 152a, 152b and a pulley shaft 232 mounted for rotation between frame portions 234a and 234b, the latter frame portions being common to stacker 140. Pulley wheels 236 are mounted on shaft 182 adjacent each of the sprockets 180 as shown in FIG. 6. Corresponding pulley wheels 238 are mounted on shaft 232. Endless belts 240 encircle corresponding pairs of pulley wheels 236 and 238. Pulley wheels 236 are driven by the rotation of shaft 182 which is in turn driven by sprockets 180 being rotated by chains 174. Sprockets 180 are somewhat smaller than the pulleys 236 so that the surface speed of belts 240 is greater than the velocity of the advancing fingers. An increase in speed of about 5% is usually sufficient to allow the fingers to clear the stacks being advanced by the entry conveyor 138.

STACKER ASSEMBLY

Stacker 140, FIG. 3, forms a pile of stacks received sequentially from entry conveyor 138 and discharges a pile of selected height to a conveyor, skid, or the like for subsequent processing. This function is accomplished by receiving each stack on a lifting conveyor 242, raising the conveyor to lift the stack a predetermined distance, retaining the stack in its raised position by a holding device 244 under the leading edge of the stack and a holding device 246 under the trailing edge of the stack, lowering conveyor 242 to its original position to receive a subsequent stack, releasing the holding devices 244, 246 to drop the raised stack onto the stack now rising on conveyor 242, raising both stacks a predetermined distance and repeating the foregoing procedure until the pile reaches a height sufficient to trip a limit switch 248 which stops the whole machine preceding the stacker 140. At this time, lifting conveyor 242 remains in its raised position and is slowly rotated to discharged the pile onto a conveyor 250. Thereafter, conveyor 242 is lowered and the whole procedure is repeated.

The lifting conveyor portion 242 of stacker 140 is positioned between frame portions 234a, 234b and frame portions 252a, 252b. Conveyor 242 comprises a pair of laterally spaced sub-frames 254a, 254b, between which a pair of pulley shafts 256, 258 are journaled for driven rotation. Pulleys 260 are spaced across and secured to the pulley shafts 256, 258 as best illustrated in FIG. 6. Endless belts 262 encircle pulleys 260 and have an upper run at the same level as belts 240 of entry conveyor 138. A sub-structure 265 secures sub-frame 254a, 254b and also supports idler rollers 266 under the upper run of belts 262.

A motor 268, secured to sub-frame 254b, is provided for driving belts 262. A clutch 264, similar to clutches 72 and 160, is mounted on an extension 266 of pulley shaft 258 and includes a pulley wheel 269 connected by a V-belt 270 to a pulley wheel 272 on output shaft 274 of motor 268. Motor 268 runs continuously but the belts 262 are rotated only when clutch 264 is energized. The belts 262 are rotated when lifting conveyor 242 is in the lowered position to receive stacks from entry conveyor 138. The belts continue to rotate until the stack reaches a backstop 276 fixed between frame portions 252a, 252b at which time the stack trips a valve 278 which de-energizes clutch 264. Simultaneously with stoppage of belts 262, conveyor 242 is lifted.

A valve 275 is mounted on frame portion 296 in a position to be tripped by sub-frame 254b. Valve 275 energizes clutch 264 to start belts 262 rotating when conveyor 242 returns to its lowermost position.

A valve 277 is mounted to frame portion 234b in a position to be tripped by a cam 279 mounted on sub-frame 254b. The function of valve 277 is to retract the holding plates 308 and 310 from beneath the pile just prior to the stack being raised reaching them so that the pile descends only a short distance. Valve 277 maintains the plates retracted until the stack being lifted is above them at which time the plates are extended beneath the pile. Valve 277 is a conventional maintained contact type, being operable only so long as it remains tripped by cam 279. Thus, cam 279 has a long contact surface 281. Valve 277 is a single-direction type so that cam 279 does not actuate it during downward travel of lifting conveyor 242.

The sub-frames 254a, 254b are guided for vertical movement by V-notched rollers 278 secured to frame portions 234a, 234b and 252a, 252b. The V-notches in rollers 278 mate with corresponding V-portions 280 formed in the edges of sub-frames 254a, 254b.

Lifting of conveyor 242 is accomplished by a crank mechanism 282 comprising a gear-box 284 driven by a continuously running motor 286 connected thereto through a conventional shaft-mounted air clutch 288. The gear-box 284 has an output shaft 290 extending from opposite sides thereof upon which are mounted driving arms 292. The driving arm 292 on one side of the gear-box is connected to a bell crank 294 toward the upstream side of the stacker and the other driving arm is connected to a bell crank 294 toward the downstream side. The bell cranks 294 are pivotally supported on a cross-member 296 between frame portions 234 and 252. Connecting links 298 connect bell cranks 294 to driving arms 292 through conventional pin connections 300. Lifting arms 302 connect the bell cranks 294 to the sub-frames 254a, 254b through pin connections 304. Thus, it can be seen, as best illustrated in FIG. 3, that rotation of output shaft 290 pivots bell cranks 294 about their fulcrums 306 thereby lifting the sub-frames 254a, 254b through the connecting links. The proportions of crank mechanism 282 are easily calculated in the known manner to give the amount of vertical travel desired.

Clutch 288, previously referred to, is actuated by valve 278 (which also stops belts 262) to elevate lifting conveyor 242 when the advancing stack has reached backstop 276. The clutch remains engaged until arms 292 have made a complete revolution and, consequently, the conveyor 242 is in its lowermost position. As the conveyor reaches the lower position, valve 275 is tripped which disengages the clutch 288. Switch 278 is ready for triggering by another advancing stack to again stop belts 262.

The input shaft 283 of gear-box 284 extends beyond the side opposite to where it is connected to coupling 288 and has a shaft mounted air brake 285 mounted thereon (similar to brake 228) for stopping rotation of the output shaft 290 of the gear-box.

It should be noted here that switch 248 not only stops the portion of the machine preceding the stacker, but also disengages clutch 288 and actuates brake 285 to stop lifting conveyor 242 in its uppermost position. Simultaneously, switch 248 activates clutch 264 to start belts 262 and signals motor 268 to run at half-speed to slowly discharge the pile onto conveyor 250.

After a stack has been received on conveyor 242 and belts 262 have stopped, the conveyor is lifted to an upper position. At this time, holding devices 244 and 246 are actuated. Holding device 244 includes a number of support plates 308 extendable horizontally beneath the raised stack to provide a support upon which the stacks may rest after the lifting conveyor is lowered. Holding device 246 includes similar support plates 310.

Holding device 244 is supported on an upstream-downstream adjustable support provided for longitudinally positioning plates 308 for the different width stacks to be handled. The adjustable support comprises upright stanchions 312a and 312b guided on spur toothed racks 314a and 314b secured between frame portions 234a, 234b and 252a, 252b. Guiding is accomplished by providing a tongue portion 316 along the bottom edge of the stanchions which mates with corresponding grooves 318 formed in the sides of racks 314a, 314b. This arrangement also prevents the stanchions 312a, 312b from tilting.

Stanchions 312a, 312b are laterally connected by cross-members 320 and 322. To adjust holding device 244 towards backstop 276, spur gears 324 are secured to stub shafts 326 rotatably mounted in stanchions 312a, 312b so that the gears are in mesh with racks 314a, 314b. Stub shafts 326 extend through stanchions 312a, 312b and have sprockets 328 secured to their outermost ends. A cross-shaft 330 is rotatably mounted in stanchions 312a, 312b at a height sufficient to permit a stack to pass thereunder onto lifting conveyor 242. A sprocket 332 is secured to the outermost ends of cross-shaft 330 beyond the stanchions. A roller chain 334 encircles the sprockets 332, 334 on the stub-shafts and cross-shaft respectively. A handwheel 336 is provided on one end of cross-shaft 330 for turning the cross-shaft which in turn will rotate gears 324 along racks 314a, 314b to position holding device 244. A conventional shaft-lock (not shown) is provided on cross-shaft 330 adjacent handwheel 336 to lock the stanchions in the position selected.

Support plates 308 of holding device 244 are moved into engagement with the bottom of a lifted stack by a pneumatic ram 338 pivotally secured to a bracket 340 by a pin connection 342; the bracket 340 being secured to cross-member 322. Each plate 308 rests on a support shaft 344 journaled between stanchions 312a, 312b. Each plate 308 is connected via pin connection 346 to an associated lever 348 pivotally supported on a cross-shaft 350 rotatably mounted in brackets 352 secured to cross-member 322. Ram 338 is connected to one of levers 348 by pin connection 354. All of levers 348 are keyed to cross-shaft 350 so that pivoting of the lever connected to the ram causes all the levers to pivot causing plates 308 to move substantially horizontally into and out of engagement with the stack.

Holding device 246 is constructed in a similar fashion to holding device 244. Support plates 310 rest on a roller 357 journaled between frame portions 252a, 252b. Each plate is connected via pin connection 356 to an associated lever 358 pivotably supported on a cross-shaft 360 rotatably mounted in brackets 362 secured to frame portions 252a, 252b. Ram 364 is pivotably supported by a pin connection 366 to a bracket 368 which is secured to frame portion 370. Ram 364 is connected to one of the levers 358 by pin connection 372. Actuation of ram 364 moves all the plates 310 either into or out of engagement with the stack, depending upon whether the ram is extended or retracted.

Figure 10:
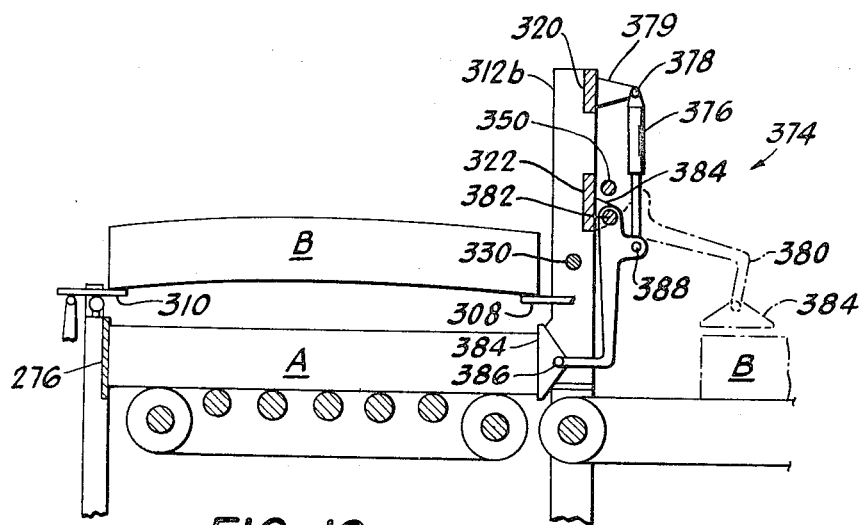
FIG. 10 is a partial view of the stacking mechanism of FIG. 3 illustrating a squaring mechanism for aligning the stacks prior to lifting them to form the pile.

Stacker 140 also includes a squaring device 374 for urging a stack on lifting conveyor 242 into full engagement with backstop 276. Squaring device 374 operates in a similar fashion to holding device 244, as best illustrated in FIG. 10. A pneumatic ram 376 is pivotally supported by a pin connection 378 on a bracket 379 secured to cross-member 320. Levers 380 are pivotally supported laterally adjacent to levers 348 on a cross-shaft 382 rotatably supported in brackets 384 secured to cross-member 322. Each lever 380 has a squaring shoe 384 connected thereto by a pin connection 386 which permits the shoe to swivel. Ram 376 is conected to one of the levers 380 by a pin connection 388. When ram 376 is retracted, the levers 380 assume the position shown by the dotted lines, leaving clearance for a stack to enter stacker 140. When ram 376 is extended, shoes 384 are urged against the trailing edge of the stack to urge it into full engagement with backstop 276. After the stack is squared, ram 376 is immediately retracted so that the stack may be lifted without interference.

Stacker 140 preferably includes a discharge roller 390 rotatably journaled between brackets 392a, 392b secured to frame portions 252a, 252b. A continuously running motor 394, mounted to bracket 396 secured to frame portion 252b, is provided for driving roller 390. A sprocket 398 on output shaft 400 of motor 394 is connected by a chain 402 to a sprocket 404 provided on roller 390. Thus, as the pile is discharged from stacker 140 by rotation of lifting conveyor 242, roller 390 supports the pile and transports it to conveyor 250 for further handling.

CONTROLS

Figure 12:
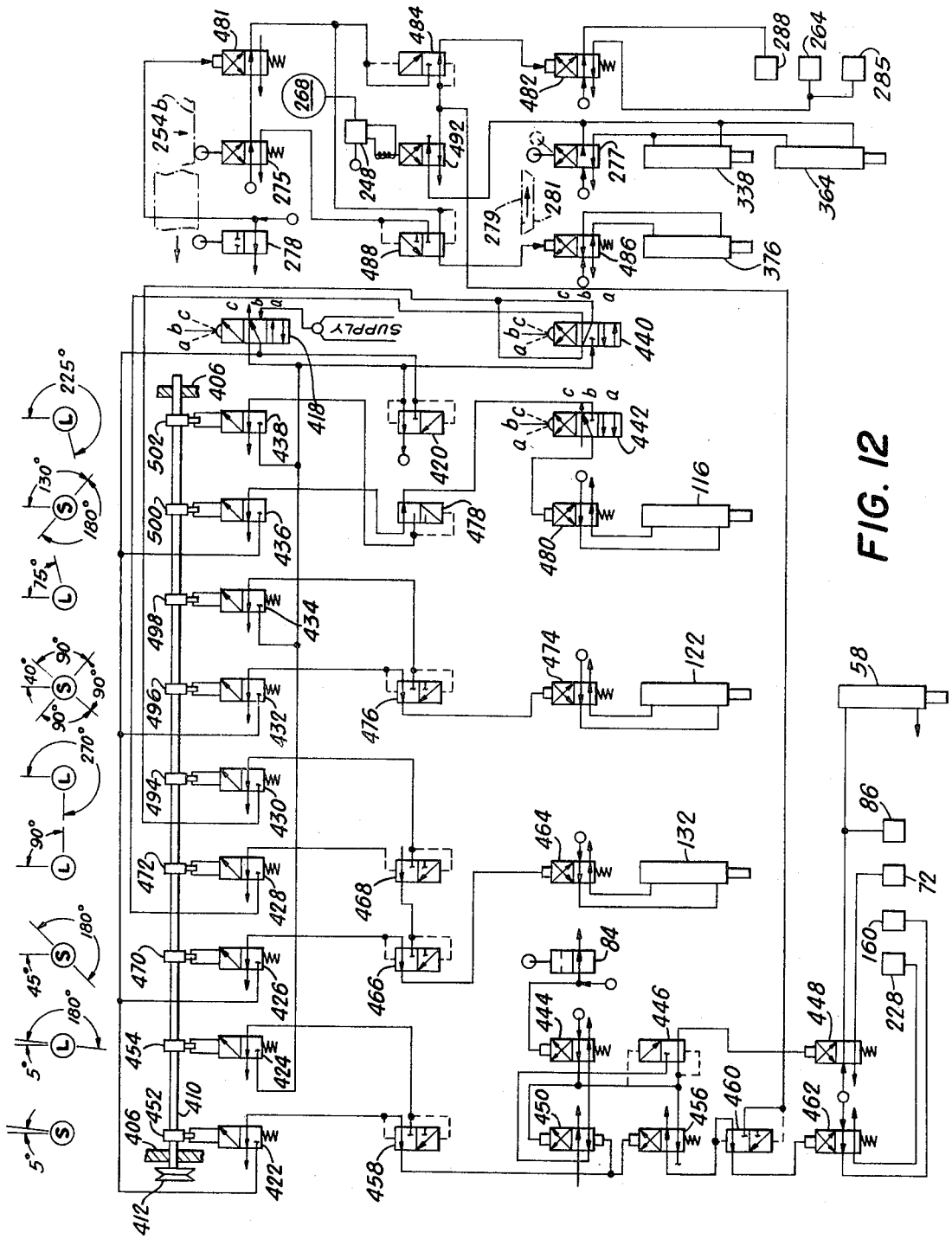
FIG. 12 is a schematic diagram of the controls used for controlling the functions of the invention.

The controls for the complete machine are illustrated schematically in FIG. 12. For the most part, the controls are pneumatic although a completely electrical system will work equally well and may be used if desired.

As illustrated herein, most of the valves used are contained in a console 406 supported by frame portion 408 as shown in FIG. 2. A cam-shaft 410 is journaled in console 406 for actuating various ones of the valves used. Cam-shaft 410 is driven by a sprocket 412 mounted thereon connected by a chain 414 to a sprocket 416 mounted on speed reducer 158.

Referring now to FIG. 12, air pressure is supplied to manually controlled valve 418 which has three operative positions a, b and c. Position a is used for narrow stacks, i.e., in the example previously given, stacks up to two and one-half feet wide. Position b is the "off" position whereby the air supply is cut off and all air lines are vented to atmosphere. Position c is used for wide stacks, i.e. for stacks between two and one-half and five feet in width.

Shuttle valve 420 is supplied with pressure from either of positions a or c of valve 418. Valve 420 supplies pressure to all nine main cam-actuated valves 422, 424, 426, 428, 430, 432, 434, 436, and 438. Each of these main valves is operated by a cam secured on camshaft 410 which rotates once for each revolution of chains 174.

A manually controlled valve 440 controls the inverting sequence. In position a, all the wide stacks are inverted face up on rising conveyor 90; in position b, all the stacks are inverted face down on rising conveyor 90; and, in position c, the stacks are inverted alternately face up and face down on conveyor 90.

Microvalve 84, located on loading conveyor 26, is triggered by, that is, senses, a stack advanced to the loading position above inverter 22.

A manually controlled valve 442 is used to interrupt the off-setting function shown in FIG. 8.

The foregoing valves are conventional. For example, valves 418, 440 and 442 may be three-position selector valves, Model 8771, such as made by Republic Manufacturing Company, Cleveland, Ohio. Valves 84 and 278 may be hair-triggered microvalves, Model HTW–40D, such as made by Mead Fluid Dynamics, Chicago, Ill. Even numbered valves 422 through 438 may be three-way roller cam-actuated spring-return, Model CW13–25, made by Parker-Hannifin, Des Plaines, Ill. Valve 275 may be a fourway Model CC13–25 made by the same company. Valve 420 may be a shuttle-valve, Model OR–25, also made by Parker-Hannifin.

For a better understanding of the operation of the controls, assume that conveyor 20 is empty, chains 174 are moving, and valves 422 and 424 are not actuated. Pressure from valve 444 flows through valve 446 to actuator valve 448. Pressure from valve 448 actuation clutch 72 and releases brake 86 and ram 58 so that belts 62 begin to move. Pressure from valve 444 also switches valve 450 from the position shown with no immediate effect.

When cams 452 and 454 trigger either of valves 422 or 424 respectively, and still no stack is on belts 62, pressure from valves 422 or 424 actuates valve 456 through valve 458. Pressure from valve 444 flows through valve 456 and valve 460 and actuates valve 462 so that the clutch 160 for chains 174 is vented to atmosphere and brake 228 is actuated. Accordingly, chains 174 are stopped but belts 62 continue to move. It should be noted that, for wide stacks, manual valve 418 supplies pressure to valve 424 and, for narrow stacks, it supplies pressure to valve 422.

Now, assuming that chains 174 are stopped and a stack triggers sensing valve 84, then valve 84 actuates valve 444. Port A–1, previously under pressure, is vented so that valve 450 is switched back to the position shown. Pressure from port A–2 flows through valves 450 and 446 to maintain valve 448 actuated so that belts 62 continue to move.

Because port A–1 of valve 444 is vented, port O–2 of valve 456 is also vented. Because valve 456 is actuated, valve 462 is also vented, through valve 460, so that it is deactivated. Thus, clutch 160 is actuated and chains 174 begin to move. When chains 174 move, camshaft 410 is rotated, as previously described, and cam 452 releases valve 422 (or cam 454 releases valve 424) so that valve 456 is deactivated and valve 462 remains vented. Note than whenever valve 462 is under pressure, chains 174 are stopped and when valve 462 is vented, chains 174 will move, Movement of belts 62 loads the stack into inverter 22 and simultaneously releases sensing valve 84. Valve 444 is thereby deactivated and pressure flows through its port A–1, and on through valve 446 to activate valve 448 to keep belts 62 running. Valve 444 simultaneously activates pilot P–1 of valve 450.

When a subsequent stack triggers sensing valve 84, valve 444 is actuated and both ports of valve 446 are vented; one through valve 444 and the other through valve 450. Accordingly, valve 448 is deactivated and belts 62 stop with the stack waiting to be loaded into inverter 22 as illustrated in FIG. 2.

While belts 62 are stopped and a stack is waiting to be loaded, chains 174 continue to move. Valve 444 is activated, with its port A–1 vented. As camshaft 410 rotates, cam 452 triggers valve 422 (or cam 454 triggers valve 424) and pressure flows through valve 458 to activate pilot P–2 of valve 450. Pressure from port A–2 of valve 444 flows through valve 450 and valve 446 to actuate valve 448 to energize clutch 72 and belts 62 start to move. Although valve 456 is also activated, chains 174 continue to move because port O–2 of valve 456 is vented through valve 444. As the stack falls into inverter 22, the sequence, previously described, is repeated wherein a subsequent stack triggers sensing valve 84 that stops the belts 62, as previously described, which are again started at the proper time by either of cams 452 or 454.

The inverting ram 132 is actuated (extended) by valve 464. Valve 464 is actuated by either of valves 466 or 468 which can be actuated by any one of valves 426, 428 or 430. Valve 426 is supplied with pressure only from position *a* of manual valve 418 which position is used for narrow stacks. Cam 470 for valve 426 has two lobes for actuating valve 426 twice for each revolution of camshaft 410 thereby causing every other stack to be inverted face down. This results only when narrow stacks are being handled since, as illustrated in FIG. 11, four stacks are handled for every complete revolution of chains 174.

Valve 428 is supplied with pressure only from position *c* of manual valve 418 which position is used for wide stacks. Cam 472 for valve 428 has only one lobe for actuating valve 428 once for each revolution of camshaft 410 thereby causing every other stack to be inverted face down. This results when wide stacks are handled since only two stacks are handled for every complete revolution of chains 174.

Provision is made for inverting every other stack of wide stacks or inverting them all face up or all face down. Selector valve 440 controls this function. Accordingly, when selector valve 418 is in position *c* for wide stacks, valve 440 must also be positioned in position *a*, *b* or *c* for the inverting sequence desired. Therefore, valve 428 is supplied with pressure from positions *a* or *c* of valve 440 when valve 418 is in position *c*. Valve 430 is supplied with pressure from position *a* of valve 440 when valve 418 is at position *c* so that all of the wide stacks are inverted face up.

The off-setting function is accomplished by actuating both rams 116 and 122. If no offset is desired, only ram 122 is actuated. For each revolution of chains 174, four offsets are required for narrow stacks and two offsets for wide stacks. Valves 432, 434, 436, and 438 are used to control rams 116 and 122. Valves 432, 436 are actuated for narrow stacks; valves 434, 438 are actuated for wide stacks. Valve 474 actuates ram 122 with pressure supplied from valve 476. Valve 472 is actuated by either valve 432 or 434. Either of valves 436 and 438 actuate valve 480 through valve 478. Valve 478 actuates ram 116.

The stacker 140 is controlled by microvalve 278 which is triggered by a stack entering upon lifting conveyor 242 and a conventional electric limit switch 248, mounted on frame portion 478, which is triggered by the pile when it reaches the desired height. Switch 248 may be positioned vertically along frame portion 478 at any desired interval to provide piles of various heights.

When valve 278 is triggered, it actuates pilot valve 481 which stops the flow of pressure to valve 482 from valve 484 and the flow of pressure to valve 486 from valve 488. Thus, clutch 264 is disengaged and lifting conveyor belts 262 stop; brake 285 is released and clutch 288 is engaged so that lifting conveyor 242 begins to rise. Simultaneously, ram 376 is actuated to activate the squaring device 374.

After rising conveyor 242 begins to rise, valve 275 is triggered by sub-frame 254*b* moving upward away from it. This stops the flow of pressure to valve 481 and instead supplies pressure to valve 486 which reverses ram 376 to retract squaring device 374. Valve 275 remains activated until lifting conveyor 242 returns to its lower position.

Cam 279, carried on sub-frame 254*b*, triggers valve 277 as lifting conveyor 242 rises. Valve 277 actuates rams 338 and 364 which retract holding plates 308 and 310 thereby letting the pile fall upon the ascending stack. The holding plates remain retracted until conveyor 242 is in its uppermost position.

Provided the pile has not yet reached its preselected height for discharge, the crank mechanism 282 continues to run so that conveyor 242 returns to its lower position. In the uppermost position of conveyor 242, the lower portion of surface 281 of cam 279 has passed valve 277, releasing it. When valve 277 is released, it actuates (extends) rams 338 and 364 to place holding plates 308 and 310 under the lifted pile. As conveyor 242 moves downward, the movement of cam 279 does not affect valve 277 because the valve works only when triggered in a single direction. As the conveyor 242 moves downward, the pressure of the stacks against valve 278 is released. However, the conveyor 242 continues to move downward because valve 275 will remain actuated until it is deactivated by contact with sub-frame 254*b*. Thereafter, the cycle is repeated until the pile reaches the height at which it is to be discharged onto conveyor 250.

Upon reaching the predetermined height, electric limit 248 is triggered which in turn actuates solenoid valve 492. However, valve 277 is still actuated by surface 281 of cam 279, and will remain so until cam surface 281 clears valve 277, so that no change occurs. However, when valve 277 is released by surface 281, pressure flows through it to valve 482 through valves 492 and 484. This deactivates clutch 288 and actuates brake 285 to stop conveyor 242 in its uppermost position. Simultaneously, electric switch 248 signals motor 268 to run at half-speed, clutch 264 being energized, to run belts 262 thereby discharging the pile onto driven roller 390 and thereafter onto conveyor 250. Valve 492 remains actuated until the stack is discharged at which time valve 482 is deactivated and the conveyor moves downward through the same cycle that occurred during normal stacking without discharge.

While conveyor 242 is stopped in its uppermost position for discharging, pressure flows through valves 277 and 492 to valve 462 through valve 460 thereby stopping movement of chains 174. The chains remain motionless throughout the time the pile is being discharged.

The various valves used in the above control system are conventional and commercially available. For example, valves 444, 464, 474, 480, 456, 462, 448, 481, 486 and 482 may be pilot operated four-way spring return pressure valves, Model CC10–25 made by Parker-Hannifin, Des Plaines, Ill. Valve 450 may be a pilot operated four-way pressure return pressure valve Model CC12–25 made by the same company. Valve 492 is a solenoid operated four-way pressure valve Model CCJ1–25, also made by Parker-Hannifin.

The various cams on camshaft 410 are preferably made angularly adjustable about the camshaft so that the timing of the machine can be easily altered if needed. Set-screws (not shown) can be used to clamp the cams to the shaft for this purpose.

From the foregoing description of the control system, it will be understood that the lobes of the cams are positioned at various angles to each other in order that the valves may be actuated in the proper sequence. Since some of the valves are actuated more than once during each operating cycle of chains 174, some of the cams have more than one lobe. For the preferred embodiment of the machine described herein, the angular position of the lobes on the cams is illustrated schematically in the top portion of FIG. 12. Although the cams continue to actuate their respective valves regardless of the length stacks being handled, some of the valves themselves are inoperative depending on the width of the stacks. Accordingly, S indicates that the cam and its associated valve are operative for narrow stacks; L indicates that the cam and its associated valve are operative for wide stacks.

OPERATION

In operation gate 18 of delivery conveyor 10 is positioned in a known manner upstream or downstream to accommodate the length of the blanks forming the stacks. Thereafter, the guide 100 in the offsetting portion of inverter 22 is positioned by clamping slide-block 118 on rods 112 as previously described. Leg 104 of guide 100 is preferably positioned about four inches from the lateral end of the stack as it enters the inverter 22.

If wide stacks are to be handled, roller supports 212 are lowered by turning handle 220 on rising conveyor 90 and clamping it in position. This causes the appropriate ones of the inverting and advancing fingers to become inoperative as previously described. For narrow stacks, roller supports 212 remain in the raised position.

The next step is to adjust the longitudinal position of holding plates 308 for the length of the stack being handled. This is done by rotating handwheel 336 on stacker 140 to move plates 308 toward or away from backstop 276. The holding device 244, carrying plates 308, is then locked in position by clamping handwheel 336.

The height of the pile to be formed is selected and switch 248 is raised or lowered accordingly and clamped on its support 478.

Thereafter, manual valve 418 is turned from "off" position $b$ to either $a$ position for narrow stacks or $c$ position for wide stacks. Manual valve 440 is turned to position $a$ if the stacks are to be all inverted face up; to position $b$ if all the stacks are to be inverted face down; or to position $c$ if alternate stacks are to be inverted face down. Manual valve 440 is operative only when wide stacks are processed, that is, at position $c$ of valve 418. Narrow stacks are always alternately inverted. Manual valve 478 is turned from the "OFF" position $b$ to position $c$ if offsetting of the stacks is desired; to position $a$ if no offsetting is desired.

A master switch (not shown) is turned on to energize motors 42, 76, 268, 286, and 394. At this time, the machine is operative and in condition to receive stacks from delivery conveyor 10.

As the blanks are supplied in stacks from the corrugating delivery conveyor 10, the stacks are received on storage conveyor 24. Conveyors 24 and 26 are operated simultaneously to advance the stack to conveyor 26 to convey the stacks to the position shown in FIG. 2. The conveyor 26 is actuated again when chains 174 are at the correct position at which point stack A and stack B are advanced simultaneously, but stack A is advanced beyond the support provided by conveyor 26. The leading edge of stack A is thus unsupported and tends to fall and its trailing edge tends to rise thereby separating any interlacing between the stacks. Stack A is received by inverter 22 and guided into an upright position. The guides 100 and 102 are operated to laterally offset the stack. Stack A is pivoted about its trailing edge by a pivoting finger carried on the rising conveyor 90 so that it falls face up on the conveyor. Thereafter, an advancing finger carried by the conveyor engages the trailing edge and advances stack A along the conveyor. Meanwhile stack B on the storage conveyor 24 has been advanced upon conveyor 26 to the position previously occupied by stack A. At the proper interval of rotation of chains 174 on conveyor 90, conveyor 26 will be rotated to load stack B into inverter 22. Stack B is offset and then pivoted about its leading edge by the inverting lever 92, so that it falls face down upon conveyor 90. Thereafter an advancing finger on chains 174 engages its trailing edge and advances it along conveyor 90. Meanwhile stack A, which has preceded stack B, is received upon entry conveyor 138 which rotates faster than chains 174 so that the trailing edge of stack A advances faster than the advancing finger so that the finger will clear the stack as it begins its return along the lower run of chains 174. Entry conveyor 138 loads stack A into stacker 140. The lifting conveyor 242 of stacker 140 is in its lower receiving position as stack A is loaded into the stacker. Upon entering the stacker, stack A will trip a valve 278 which simultaneously stops rotation of belts 262 of conveyor 242 and raises the lifting conveyor to an upper position. Upon reaching the upper position, supporting plates 308 and 310 are operated to engage the underside of stack A to support it in the upper position. Conveyor 242 is then returned to its lower position for receiving subsequent stack B from entry conveyor 138. Stack B is then lifted toward the upper position by conveyor 242. As the stack approaches stack A, the supporting plates 308 and 310 are retracted from beneath stack A so that stack A falls upon stack B. Conveyor 242 continues to rise thereby lifting both stack A and stack B to the upper position whereupon support plates 308 and 310 are again operated to engage the underside of stack B to support both stacks A and B in the upper position. Conveyor 242 again returns to its lower position for receiving a subsequent stack A. The foregoing steps are repeated until the pile of stacks in stack 140 reaches a height sufficient to trip limit switch 248. Limit switch 248 is operative to stop the conveyor 242 in its uppermost position and simultaneously rotate belts 262 of conveyor 242. This causes the pile of blanks resting on the belts to be discharged to the left, as shown in FIG. 3, upon driven roller 390 which aids in advancing the pile to conveyor 250 for further handling.

The pile in stacker 140 is comprised of individual small stacks, the alternate ones of such stacks being offset with respect to the next adjacent stack and alternate ones of the individual stacks facing upwardly and downwardly. As previously explained, the inverting mechanism is operative to place all stacks in either a face-up or face-down position so that the pile in conveyor 140 may have all of the stacks face up or face down. In addition, as previously explained, the off-setting mechanism is made operative to place all of the stacks in lateral endwise alignment so that the pile formed in stacker 140 has no off-set stacks.

Having thus described the invention in its best embodiment and mode of operation, that which is desired to be claimed by Letters Patent is:

1. A method of separating any interlacing existing between horizontally contiguous but separately spaced stacks of container blanks upon a support means while maintaining the integrity of the individual stacks, comprising:

advancing said stacks simultaneously along said support means, but advancing the first of said stacks beyond said support means a distance sufficient to cause the leading edge of said first stack to be unsupported and to fall to a substantially inclined vertical position and its trailing edge to rise while maintaining the stack configuration whereby said interlacing between said stacks is separated.

References Cited

UNITED STATES PATENTS 2,847,110   8/1958   Rysti _____ 214—8.5 X

GERALD M. FORLENZA, Primary Examiner

R. J. SPAR, Assistant Examiner

U.S. Cl. X.R.

29—427